Nov. 17, 1953 C. W. ADSHEAD 2,659,300

TICKET PRINTING AND ISSUING MACHINE

Filed Oct. 17, 1949 14 Sheets-Sheet 1

INVENTOR
C. W. ADSHEAD
by Wilkinson Mawhinney
Attys.

INVENTOR
C. W. ADSHEAD
by Wilkinson Mawhinney
Attys.

Nov. 17, 1953 C. W. ADSHEAD 2,659,300

TICKET PRINTING AND ISSUING MACHINE

Filed Oct. 17, 1949 14 Sheets-Sheet 3

INVENTOR
C.W. ADSHEAD
by Wilkinson, Mawhinney
Attys.

Nov. 17, 1953 C. W. ADSHEAD 2,659,300

TICKET PRINTING AND ISSUING MACHINE

Filed Oct. 17, 1949

14 Sheets-Sheet 4

INVENTOR
C. W. ADSHEAD
by Wilkinson Mawhinney
Attys.

Nov. 17, 1953 C. W. ADSHEAD 2,659,300

TICKET PRINTING AND ISSUING MACHINE

Filed Oct. 17, 1949

14 Sheets-Sheet 5

INVENTOR
C. W. ADSHEAD
by Wilkinson Mawhinney
Attys.

Nov. 17, 1953 C. W. ADSHEAD 2,659,300

TICKET PRINTING AND ISSUING MACHINE

Filed Oct. 17, 1949 14 Sheets-Sheet 6

INVENTOR
C. W. ADSHEAD
by Wilkinson & Mawhinney
Att'ys.

Nov. 17, 1953 C. W. ADSHEAD 2,659,300

TICKET PRINTING AND ISSUING MACHINE

Filed Oct. 17, 1949 14 Sheets-Sheet 7

INVENTOR
C. W. ADSHEAD
by Wilkinson & Mawhinney
Attys.

Nov. 17, 1953 C. W. ADSHEAD 2,659,300

TICKET PRINTING AND ISSUING MACHINE

Filed Oct. 17, 1949 14 Sheets-Sheet 8

INVENTOR
C. W. ADSHEAD
by Wilkinson Mawhinney
Attys.

INVENTOR
C. W. ADSHEAD
by Wilkinson & Mawhinney
Attys.

INVENTOR
C.W. ADSHEAD
by Wilkinson & Mawhinney
Attys.

Nov. 17, 1953 C. W. ADSHEAD 2,659,300

TICKET PRINTING AND ISSUING MACHINE

Filed Oct. 17, 1949 14 Sheets-Sheet 11

INVENTOR
C. W. ADSHEAD
by Wilkinson & Mawhinney
Attys.

Nov. 17, 1953 C. W. ADSHEAD 2,659,300

TICKET PRINTING AND ISSUING MACHINE

Filed Oct. 17, 1949 14 Sheets-Sheet 12

INVENTOR
C. W. ADSHEAD
by Wilkinson & Mawhinney
Attys.

INVENTOR
C.W. ADSHEAD
by Wilkinson & Mawhinney
Attys.

Nov. 17, 1953

C. W. ADSHEAD 2,659,300

TICKET PRINTING AND ISSUING MACHINE

Filed Oct. 17, 1949

14 Sheets-Sheet 14

INVENTOR
C. W. ADSHEAD
by Wilkinson & Mawhinney
Attys.

Patented Nov. 17, 1953

2,659,300

UNITED STATES PATENT OFFICE 2,659,300

TICKET PRINTING AND ISSUING MACHINE

Charles William Adshead, London, England, assignor to Setright Registers Limited, London, England, a British company Application October 17, 1949, Serial No. 121,832

Claims priority, application Great Britain October 18, 1948

13 Claims. (Cl. 101—69)

The invention relates to machines for printing and issuing tickets and has for an object the provision of a machine which will print tickets of different characteristics (e. g. different price values) on to separate blank ticket strips and then issue such tickets from the machine. The printing of the tickets on independent blank strips has the advantage that the strips may be of contrasting colours or other characteristics (e. g. dimensions) appropriated to the different ticket values. A further object is the provision of a machine which, as a result of a simple manipulation, will issue automatically a pre-selected quantity of any of the different tickets.

The invention in its broad form consists in a ticket printing and issuing machine comprising two or more independently operable printing mechanisms allocated to tickets of different characteristics, mechanisms for independently feeding a corresponding number of blank ticket strips to the several printing mechanisms respectively and for issuing tickets after printing, means for selecting any one of the printing mechanisms and the associated feeding mechanism for operation and means for causing automatic operation of the selected printing and issuing mechanisms to print and issue any one of a range of quantities of tickets (say 1, 2, 3 or 4 tickets).

In the preferred form of the machine, the selection of any one of the printing mechanisms and its associated feeding mechanism automatically cancels a previous selection. In one construction of the machine, embodying this feature, the selecting means comprise a group of push buttons allocated to the several printing and issuing mechanisms respectively, a corresponding number of abutments movable with the push buttons respectively and a spring-urged sliding interlock common to all the buttons of the group and arranged, in a manner known in connection with push-button station-selecting devices for domestic radio receivers, to engage the abutment appropriated to a depressed button and thereby to hold the button depressed against the action of a return spring or the like until the operation of a second button disengages the slide from the abutment to release the first said button.

It is also preferred that the means for causing automatic operation of the selected printing and issuing mechanism embodies, as control means, a group of push-buttons allocated to the several quantities of tickets respectively.

More specifically the ticket printing and issuing machine provided by the invention comprises:

(*a*) Two or more independently operable printing blocks and platens allocated to tickets of different characteristics (e. g. values) and arranged for relative reciprocation to apply printing pressure to blank ticket strips fed between the blocks and platens;

(*b*) A corresponding number of pairs of feeding rollers allocated to the several printing blocks respectively and arranged for relative movement into pressure engagement to feed blank ticket strips between the printing blocks and platens and to issue the printed tickets from the machine;

(*c*) A group of a corresponding number of press buttons allocated to the blocks and feed rollers respectively and operable to select for operation any one of the printing blocks and to cause strip feeding pressure engagement between the pair of feed rollers associated with the selected block;

(*d*) An electric motor or other driving means;

(*e*) A primary driven shaft or the equivalent;

(*f*) A releasable pawl and ratchet driving connection between the motor and the driven shaft;

(*g*) A control shaft or the like;

(*h*) An abutment or several such abutments, rotatable with the control shaft from a position in which the abutment, or preferably a member displaced thereby, lies in the path of the pawl as the pawl rotates and serves on contact therewith to disengage the pawl from the ratchet and thereby to release the drive, into any one of a series of positions outside said path;

(*i*) A further group of push buttons for selecting any one of a predetermined range of quantities of tickets;

(*j*) Driving connections of varying ratios between the quantity push buttons and the control shaft, the ratios being such that the control shaft and abutment are rotated on operation of the buttons from the pawl-disengaging position of the abutment through varying angles of rotation depending upon the quantity values of the push buttons, into the aforesaid positions of the abutment outside the path;

(*k*) A drive between the primary driven shaft and the control shaft to set the control shaft to the disengaging position of the abutment, or of the next of the abutments when there is more than one, after the primary shaft has been rotated a sufficient number of turns to print and issue the quantity of tickets selected;

(*l*) Cam means driven by the primary shaft for operating any "selected" printing block and platen; and (*m*) Intermittent driving means between the primary shaft and one of each pair of the feed rollers to rotate the rollers between the printing operations of the printing blocks and thereby to cause the pair of rollers in pressure engagement to feed fresh portions of the strip to the operative printing block and to issue the tickets printed.

Other features of the invention will appear from the following description, by way of example, of a specific embodiment of a machine according to the invention. These features include locking means preventing the depression at any one time of two or more buttons in either group, locking means preventing a change in the selected printing and issuing means during the operation of printing and issuing, counters for the numbers of tickets issued, an ink ribbon feed, means for changing some of the items printed, switches for energising the motor and for stopping the machine should a supply of blank strip fail and guillotines for cutting off the issued tickets.

The machine forming the subject of this example is intended for issuing theatre or cinema tickets of varying values and of colours corresponding to the several values. The machine is illustrated in the accompanying drawings which are, to some extent, diagramatic, and in which.

Figures 1, 24:
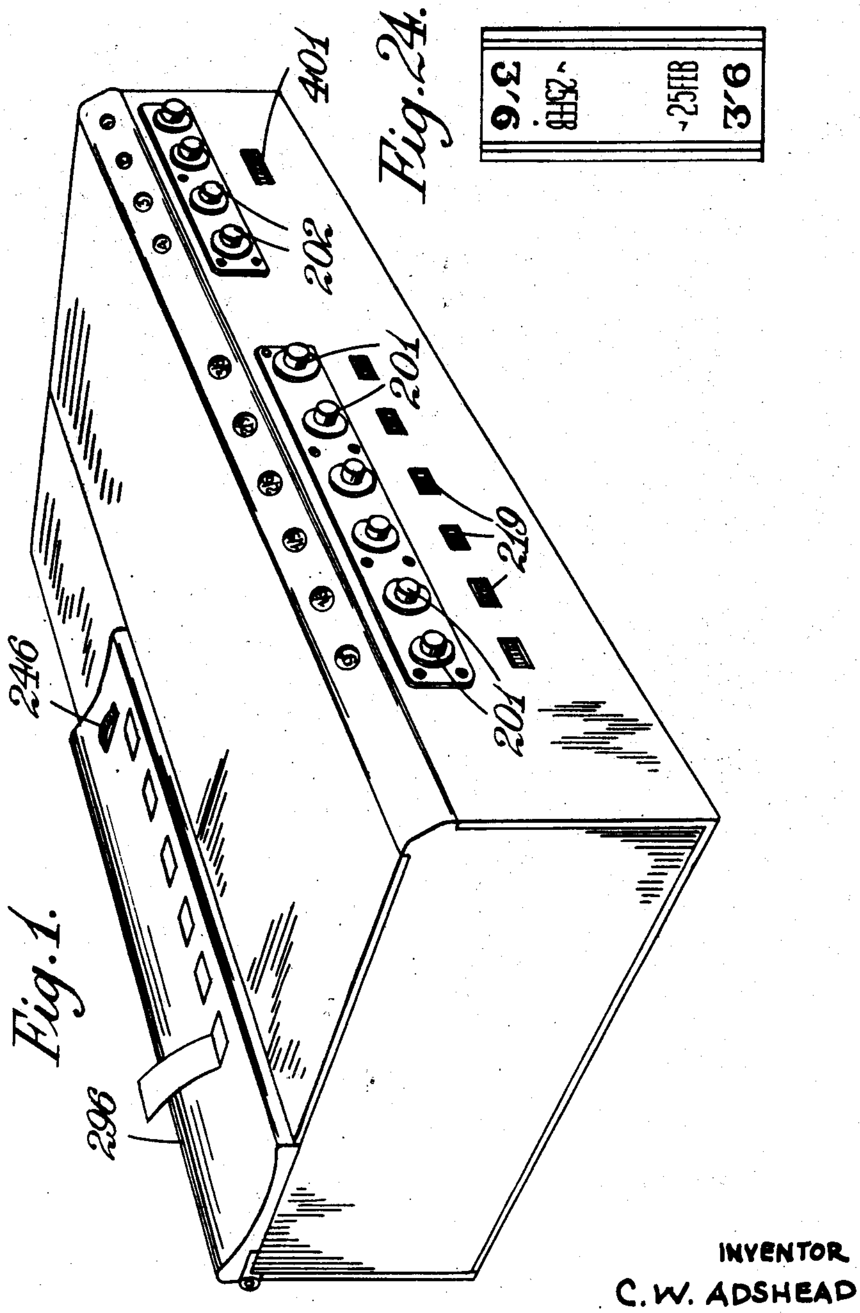
Figure 1 is a perspective view of the machine.
Figure 24 shows one of the tickets issued by the machine.

The machine illustrated in the drawings is arranged to print and issue one, two, three or four tickets of any one of six different values. The tickets are printed on blank paper strips of different colours appropriated to the several values. The machine has six push buttons 201 and four push buttons 202. The buttons 201 select the particular value of ticket which will be issued and the buttons 202 select the quantity of tickets which will be issued. To operate the machine to issue tickets of a particular value it is only necessary to select this value by depressing the button 201 appropriated to that value—if this button has been depressed as a result of a preceding operation no selecting action is necessary—and then to depress the button 202 appropriated to the quantity of tickets within the range 1–4 which is required. The machine will then automatically print and issue the desired number of tickets of the desired value.

*Ticket printing and issuing mechanisms*

The printing mechanism comprises, for each of the six values, a fixed printing block 203 and a reciprocable platen 204 arranged to apply printing pressure to a paper strip 205 the ink being supplied by an ink ribbon 206 between the paper and the printing block. The printing pressure is derived from a spring 207 surrounding the stem 208 of the platen 204 and supported on a guide member 209. A bell crank 210 is pivoted to the frame of the machine at 211 and by engagement of a pin 212 in the stem 208 holds the platen away from the printing block and the spring 207 compressed. A cam 214 on a shaft 215—constituting the primary driven shaft of the machine—engages a roller follower 217 supported on the arm 216 of the bell crank and serves to control the movements of the platen. The bell crank 210 is connected by a link 218 to a counter 219 for indicating the number of operations of the platen and hence the number of tickets issued by that particular printing mechanism. The arm 216 of the bell crank is latched by an arm 220 pivoted centrally to the frame of the machine at 221, thus holding the platen 204 away from the printing block 203. On pressing the corresponding button 201 the arm 220 is rocked, and the arm 216 of the bell crank released, thus enabling the platen to operate.

Figures 13, 14:
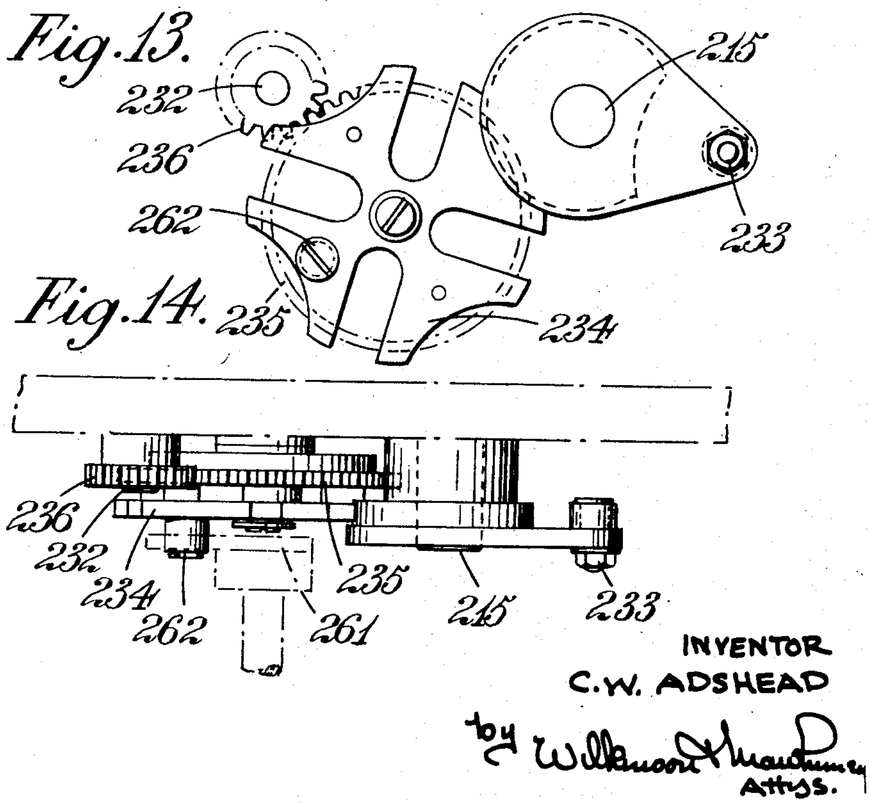
Figure 13 is a view on the line 13—13 in Figure 2A, showing the drive for the feed rollers.
Figure 14 is a plan of the mechanism shown in Figure 13.

Mounted below the printing block there is a feed roller 225 and below the platen there is an idler roller 226 carried on a lever 227 pivoted at 228 to the machine frame, and held away from the paper, except when issuing a ticket, by the spring 229. The roller 226 is movable, by means of lever 227, towards and away from the roller 225 and is arranged to press by springs 230, the ticket strip 205 against the roller 225 so that rotation of the roller feeds the strip between the printing block and platen. All six of the rollers 225 are secured to a shaft 232 which is driven from the primary shaft 215 by means of the Geneva mechanism and gear train shown more particularly in Figures 13 and 14. Secured to the shaft 215 there is a crank pin 233 which engages in the Geneva wheel 234 and intermittently drives the gears 235—236 to cause intermittent rotation of the shaft 232, the timing of the Geneva motion in relation to the reciprocations of the platens, the ratio of the gears and the diameter of the rollers 225 being such that at each rotation of the shaft 215 the ticket which has been printed is fed upwardly from between the platen and the printing block during the time that the platen is withdrawn from the block.

Figures 17, 18:
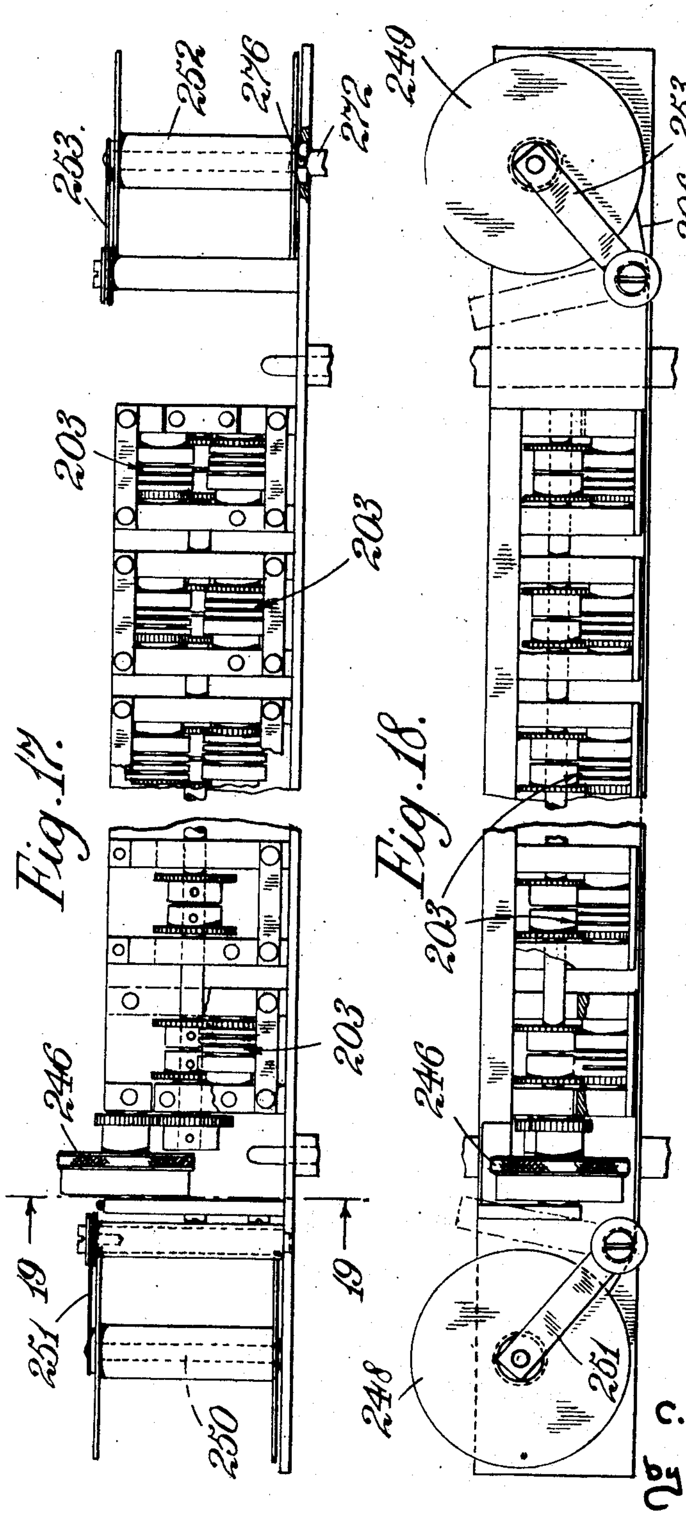
Figure 17 is an elevation of a detachable unit consisting of the printing blocks and ribbon spools.
Figure 18 is a plan view of the unit shown in Figure 17.
Figures 19, 20:
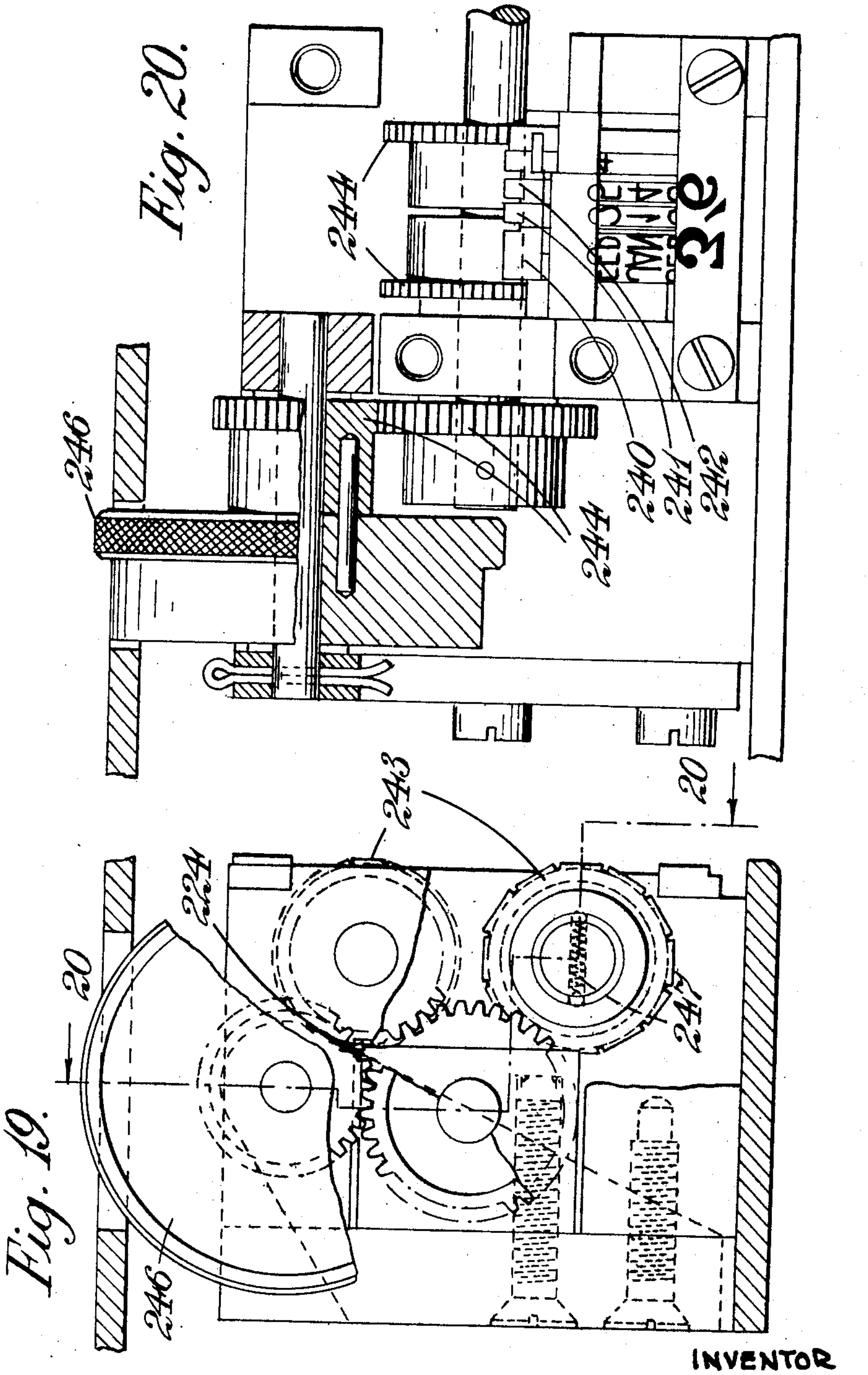
Figure 19 is a view in the direction 19—19 in Figure 17, and shows the type changing mechanism.
Figure 20 is a section in the direction 20—20 in Figure 19.

The printing blocks and rollers for the ink tape are readily removable as a unit from the machine, the unit being shown in Figures 17 and 18. The blocks are arranged to print in duplicate at each end of each ticket and in the manner shown in Figure 24 the value of the ticket and the date and hour of issue. In Figure 24 the small figure 7 at the side of the date indicates the hour at which the ticket was issued. The value figures are fixed to the block. The letters and figures of the date are manually adjustable by rotation of the wheels 240, 241 and 242 and the wheels are readily accessible for this purpose when the unit has been removed from the machine, this operation being performed once a day. The figures for the hour are changed by hand and without removal of the unit. The hour wheels 243 of the several printing blocks are in engagement through a gear train 244 to a single knurled wheel 246 accessible at the top of the machine. At each hour during the operation of the machine the operator rotates the wheel 246 to change the wheels 243 for all the blocks. Spring detents 247 are provided for all of the driven wheels to retain them in the printing position.

Figure 2A:
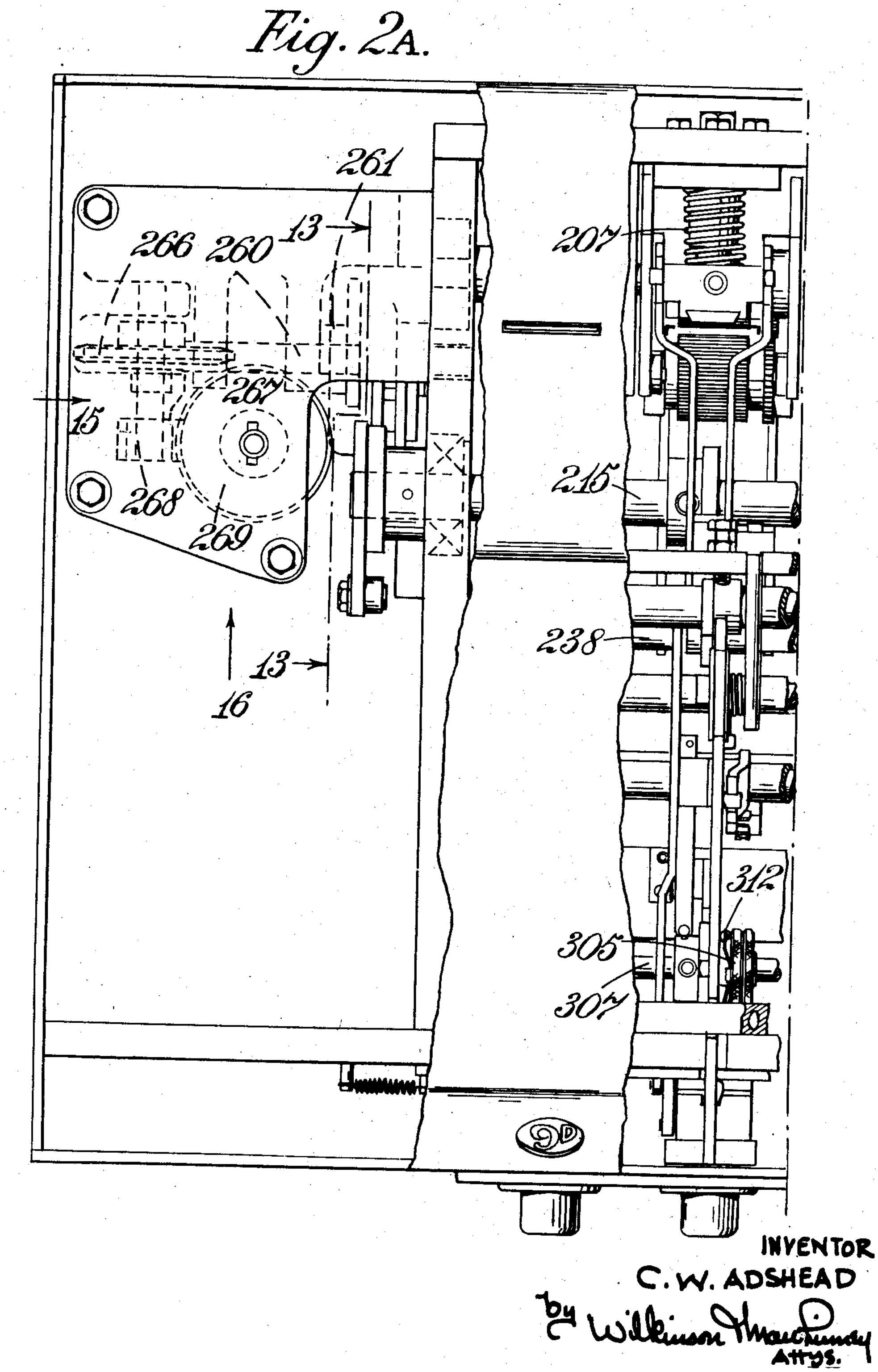
Figure 2 is a plan view of the operative parts of the machine, the figure being divided into three parts labelled 2A, 2B and 2C.
Figures 15, 16:
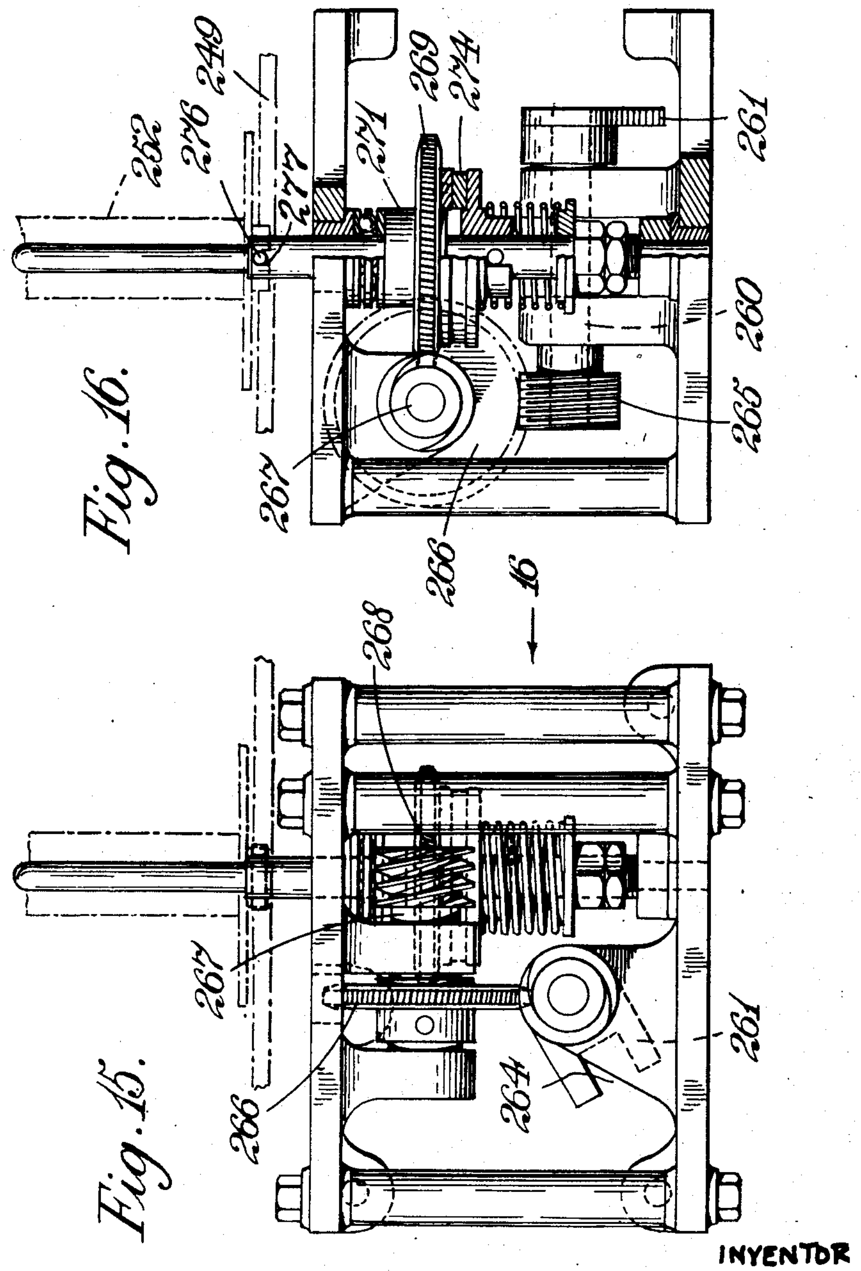
Figure 15 is a view of the ribbon feed mechanism in the direction of the arrow 15 in Figure 2A.
Figure 16 is a view showing the ribbon feed mechanism in the direction of the arrows 16 in Figures 2A and 15.

The unit carrying the printing blocks also carries a supply reel 248 and wind-on reel 249 for the ink tape 206. The reel 248 is mounted on a guide pillar 250 on the frame of the unit and is held by a spring clip 251. The reel 249 has a shank 252 passing through the lower plate of the unit frame and is held by a spring clip 253. The wind-on reel 249 is slowly rotated during the operation of the machine to feed the ribbon by means of a mechanism shown in Figures 2A, 15 and 16. This mechanism comprises a double worm reduction gear driven from a shaft 260 on which a drive arm 261 is secured. The drive arm is rotated by a pin 262 on the surface of the Geneva wheel 234 and bearing in a slot 264 on the said arm. A worm 265 on the shaft 260 engages a worm wheel 266 on a cross-shaft 267 which carries a second worm 268 engaging a worm wheel 269 on a vertical shaft 271. The shaft 271 is rotatable on and drives a spindle 272 through a friction drive 274. The upper part of the spindle 272 fits inside the reel 249 and a driving pin 276 makes driving engagement with the cross slot 277 in the shank 252.

Figure 22:
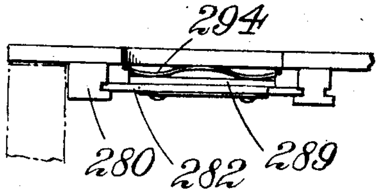
Figure 22 is a detail elevation of part of a guillotine showing the arrangement of a spring.
Figure 21:
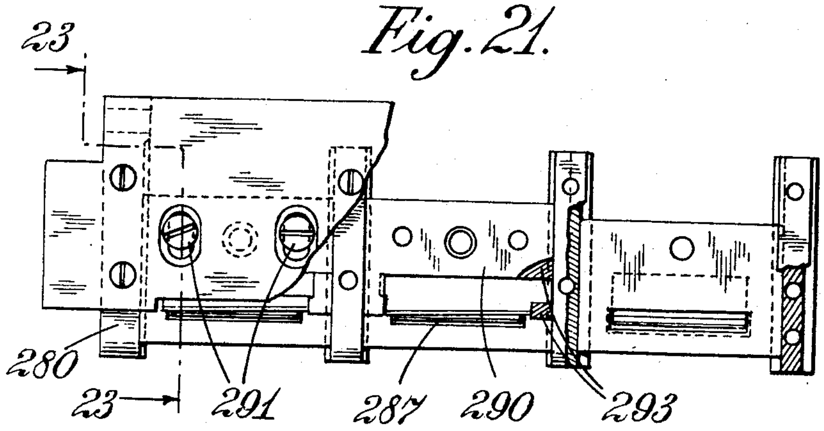
Figure 21 is a plan view of guillotines used for cutting off the tickets.
Figure 23:
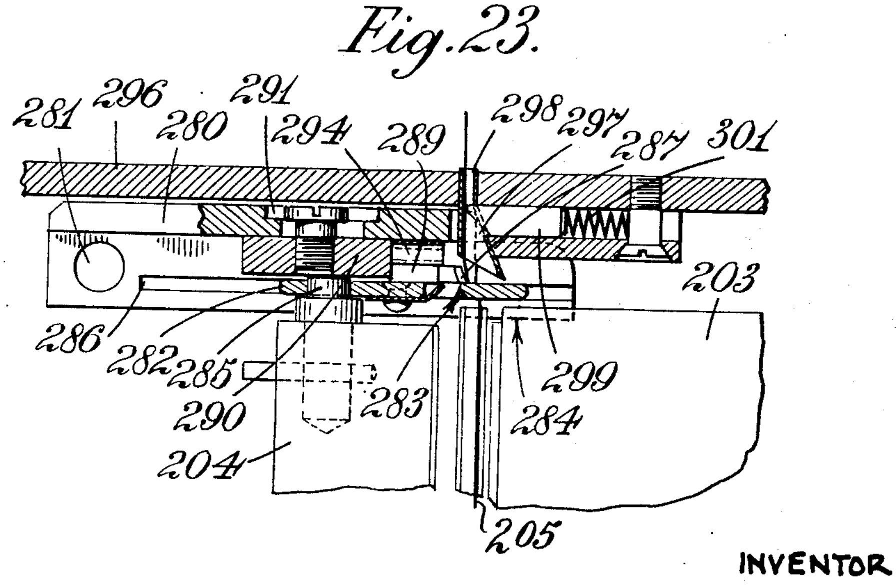
Figure 23 is a section on the line 23—23 in Figure 21.

Each of the printing blocks is provided with a guillotine for cutting off the tickets one by one as they are issued. The guillotines have a housing 280 (Figures 21, 22 and 23) hinged to the frame of the machine at one edge 281 and resting at the ends of the free edge 284 on the machine frame. A slide 282 with a cutting edge 283 is attached to the platen 204 at 285 for reciprocation thereby in a groove 286 in the said housing. The cutting edge 283 co-operates with a cutting edge 287 of a fixed blade 289, which is held in a block 290 adjustably secured to the housing by set screws 291. The blade is prevented from longitudinal movement in the block by ears 293, but is permitted a limited vertical movement, and is pressed downwards against the slide 282 by a leaf spring 294. Immediately above the guillotine housings is the lid 296 of the machine case. For each guillotine, there is a guide 297 to guide the paper from the cutting edges to a slot 298 in the machine lid. A plate or plunger 299 held against the guide by a light spring 301 prevents the return of tickets once they have been issued.

In the event of the paper supply failing for a particular value or values a switch mechanism provided for each of the ticket value selection mechanisms, will operate to prevent the printing action for the value or those values, only, for which the paper supply has failed.

Figure 2B:
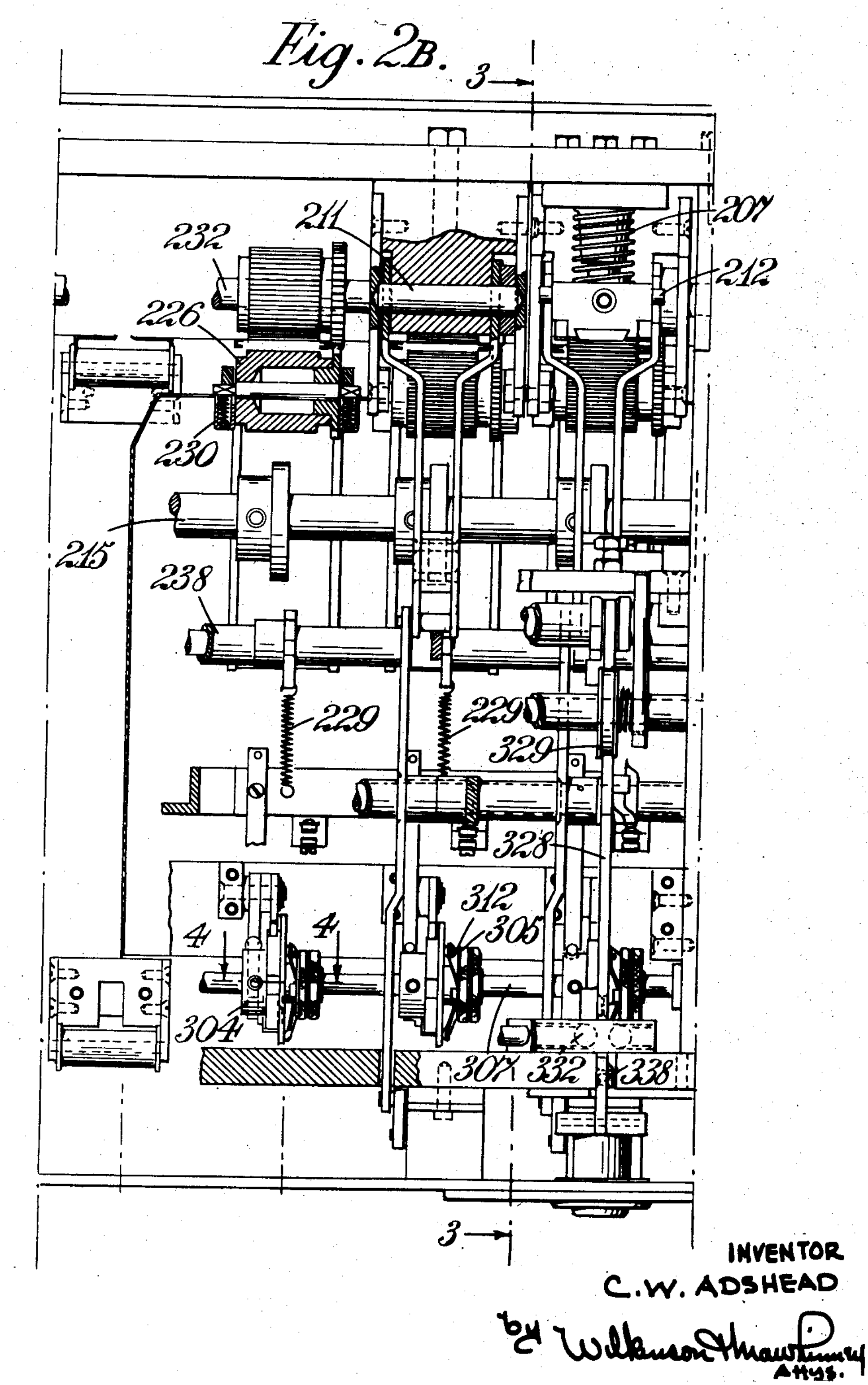
Figure 2C:
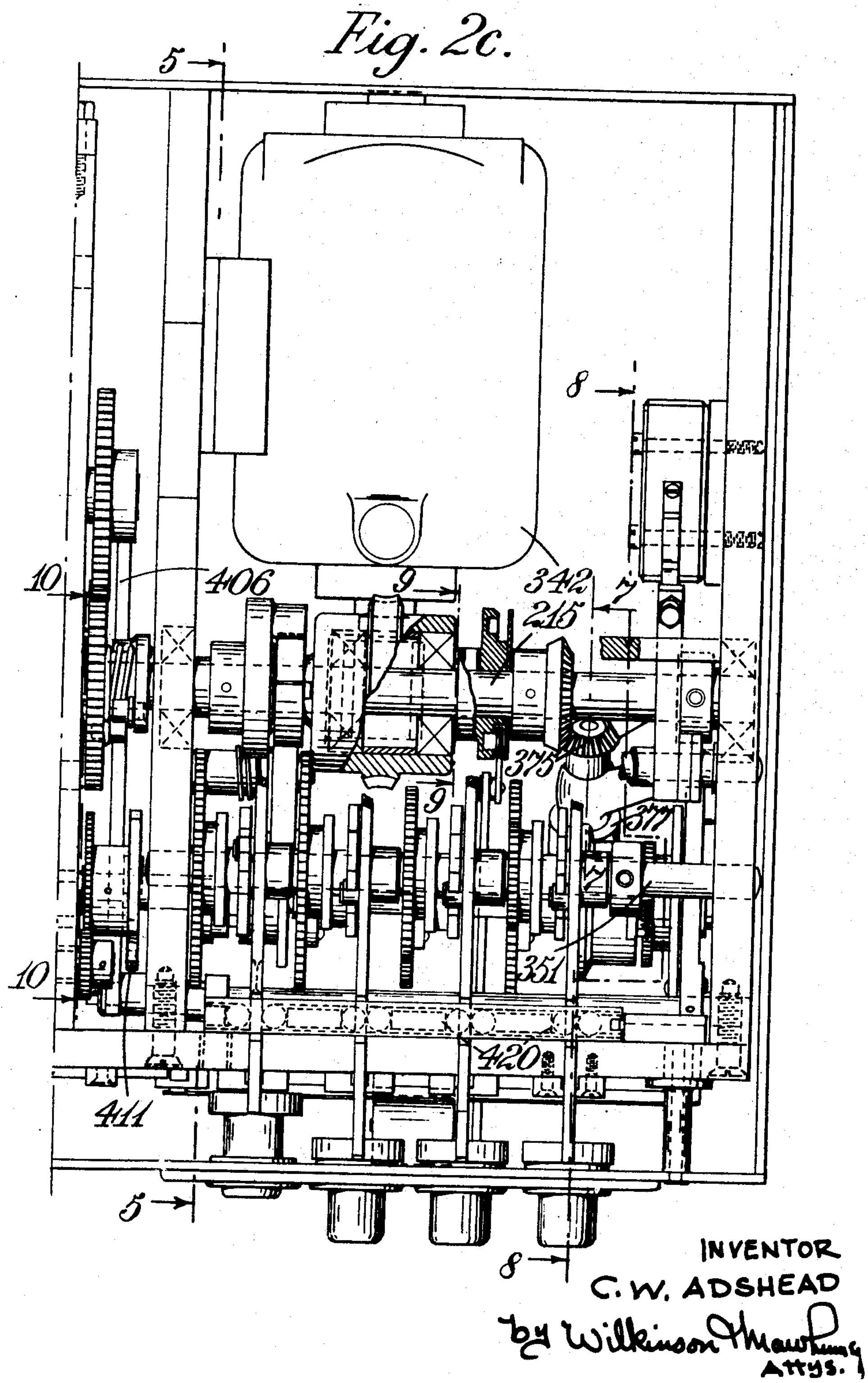
Figure 3:
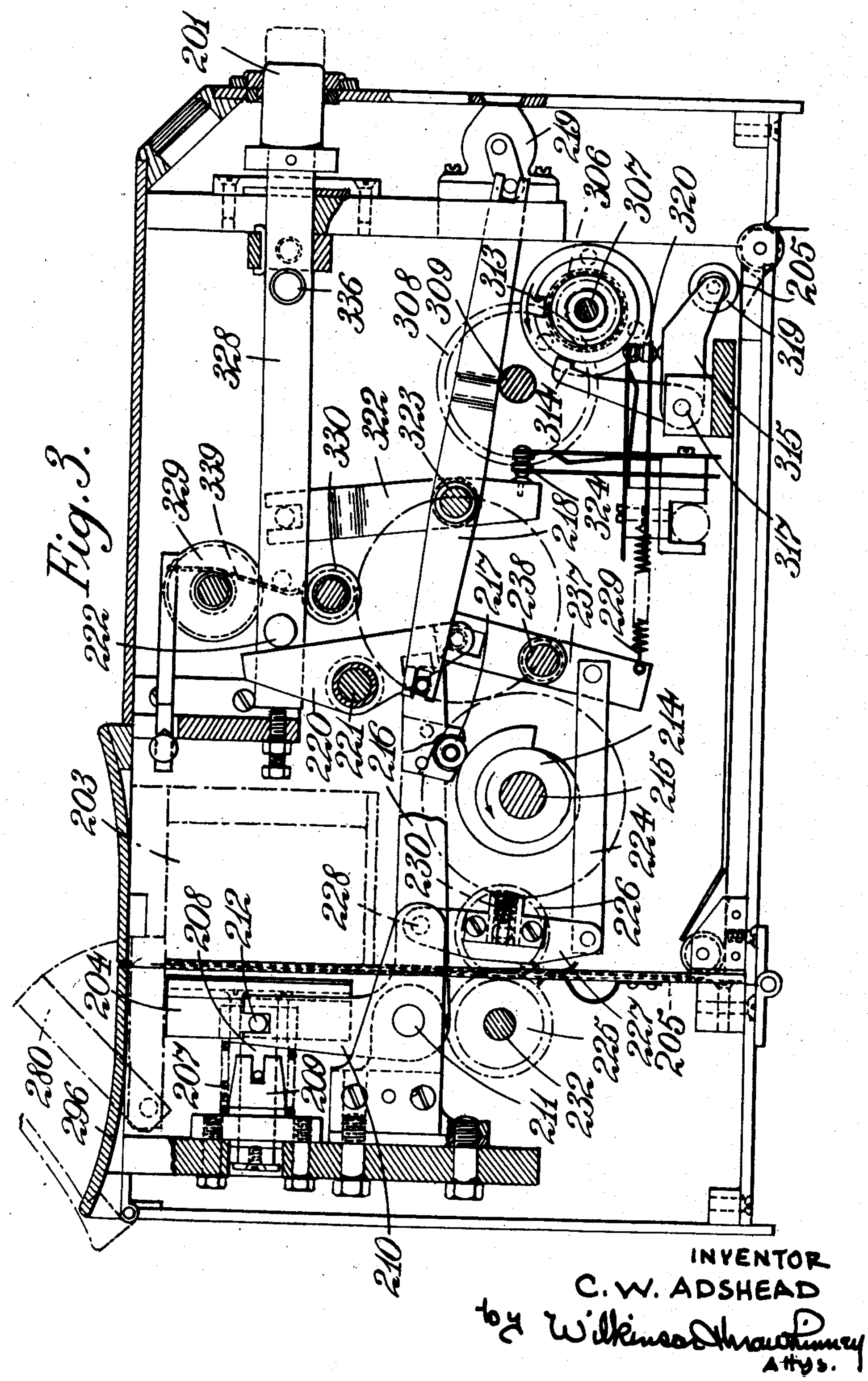
Figure 3 is a section on the line 3—3 in Figure 2B, and shows one of the value selecting mechanisms.
Figures 4, 5:
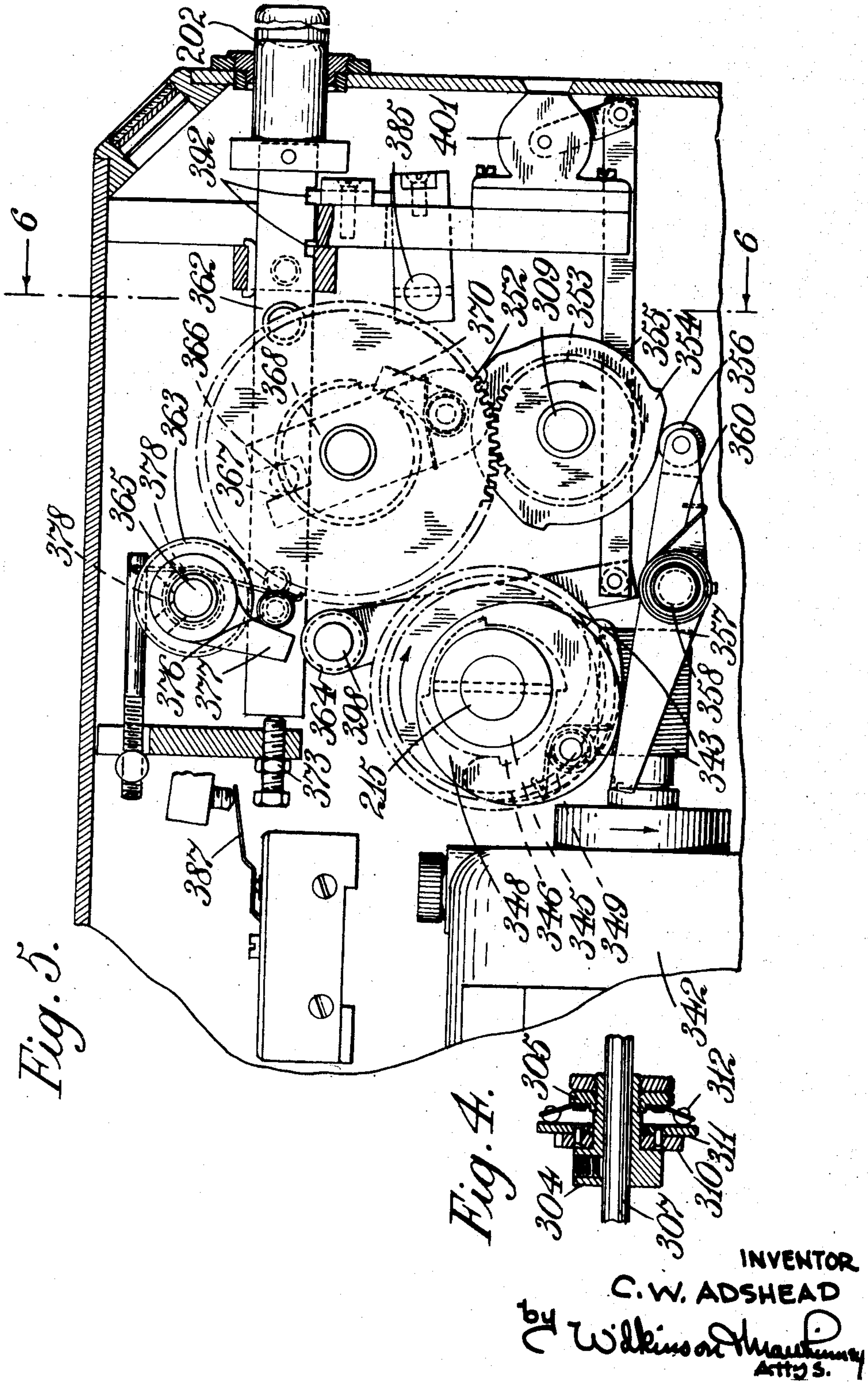
Figure 4 is a detail section on the line 4—4 in Figure 2B.
Figure 5 is a section on the line 5—5 in Figure 2C, and shows one of the quantity selecting mechanisms and part of the operating means therefor.

The said switch mechanism is shown in Figures 2B, 3 and 4.

A gear 306 carried on shaft 307 is driven by another gear 308 on a shaft 309, driven by a mechanism to be described with the "Quantity selecting and driving mechanisms."

The shaft 307 carries, for each printing mechanism, a collar 304 integral with a disc 305 driving another disc 310, through a friction disc 311 engaged by spring arms 312 carried by disc 305.

Each disc 310 is provided with an indent 313 into which a pawl 314, at one end of a bell-crank 315 pivoted at 317 to the frame of the machine, may fall when a roller 319 on the free end of the other end of the bell crank is no longer supported by the paper strip 205. The indent 313 is normally positioned on the shaft 307 for presentation to the pawl 314 when the machine has completed the issue of the tickets for which it has been set as later described.

When the pawl 314 drops into the indent 313 contacts 320 in the control circuit of the motor are opened.

Each button 201 has associated with it a rocker arm 322 pivoted at 323 to the machine frame and contacts 324 which are also in the control circuit of the motor. The contacts 320 and 324 for the several buttons are in parallel control circuits for the motor, the contacts 320 and 324 of each circuit being in series, and the arrangement is that if any one circuit is broken at the contacts 320 it is not possible to start the motor when the button 201 appropriated to that circuit is depressed whereas the machine will operate normally on depression of any other of the buttons. It will be appreciated that during such operation the friction drive to any disc engaged by a pawl 314 slips.

*Value selecting mechanism*

Associated with each printing block and pair of feed rollers there is a selecting push button 201. Each of the six buttons operates mechanism for engaging the associated feed rollers and for releasing the platen for operation. The mechanism of one of the push buttons is shown more particularly in Figure 3. Each of the buttons 201 is secured to a slide bar 328 which is guided for lengthwise reciprocation in grooved wheels 329, 330, and close to the end opposite to the button a pin 222 on the arm engages against the arm 220. On pressing a button 201, the bar 220 is rocked, moving an arm 237, pivoted at 238 to the machine frame, thus extending spring 229, and through links 224 and 227 the roller 226 is pressed by the springs 230 to grip the ticket strip against the roller 225.

Figures 10, 11:
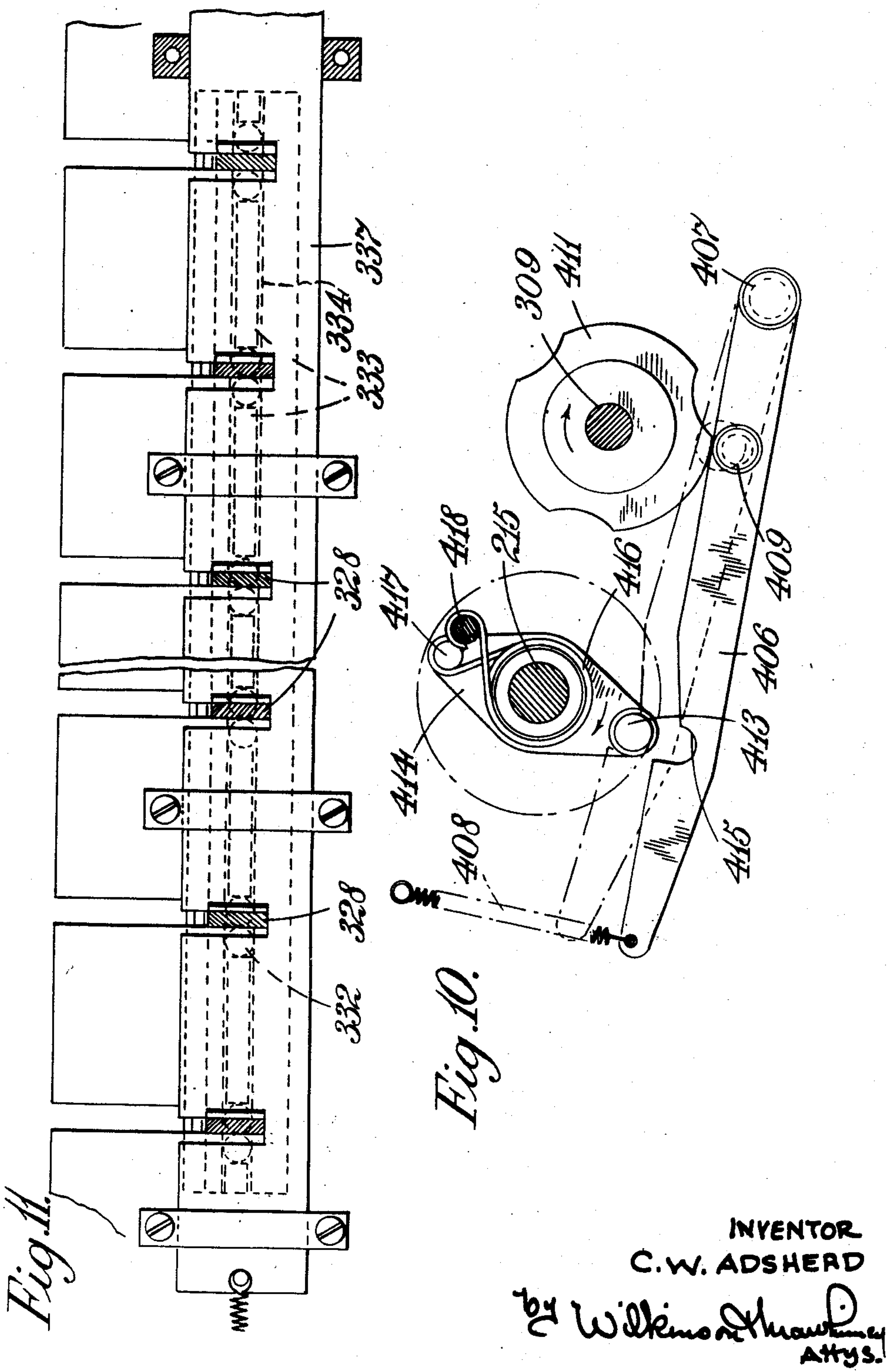
Figure 10 is a view in the direction 10—10 in Figure 2C showing arresting mechanism.
Figure 11 is a view of means for locking the selecting buttons.

To ensure that it is impossible inadvertently to depress two of the buttons 201 at the same time there is provided a row of balls 332 (Figure 11) and rods 333 in a housing 334, there being only sufficient endwise room in the housing for the accommodation of the balls and rods and the thickness of one of the bars 328. In the normal position of the bars the balls fit in holes 336 formed in the bars but when a button is depressed the thickness of the bar is inserted between the appropriate pair of balls and there is then insufficient room in the housing to enable a second button to be depressed.

Each of the bars 328 is formed with an abutment 338 which during depression of a button serves as a latch to move sideways a slide 337 (Figure 11) which is spring-urged towards the left as viewed in Figure 2B. When the button is fully depressed the slide returns to this left-hand position and retains the button depressed until operation of a second button again moves the slide to the right and thereby releases the first button which is restored to its initial position by a spring 339.

*Quantity selecting and driving mechanisms*

The machine is driven by an electric motor 342 which is energised on depression of any one of the buttons 202 and drives a worm and worm wheel 343 mounted for rotation on the shaft 215. Secured to the worm wheel for rotation therewith is a wheel 345 having dog teeth 346. Secured to the shaft 215 is a disc 348 carrying on one face a spring-urged pawl lever 349 (Figure 5). This lever is arranged to engage in dog teeth 346 so that during engagement of the pawl with one of the teeth the shaft 215 is positively rotated by the motor.

Figures 6, 7:
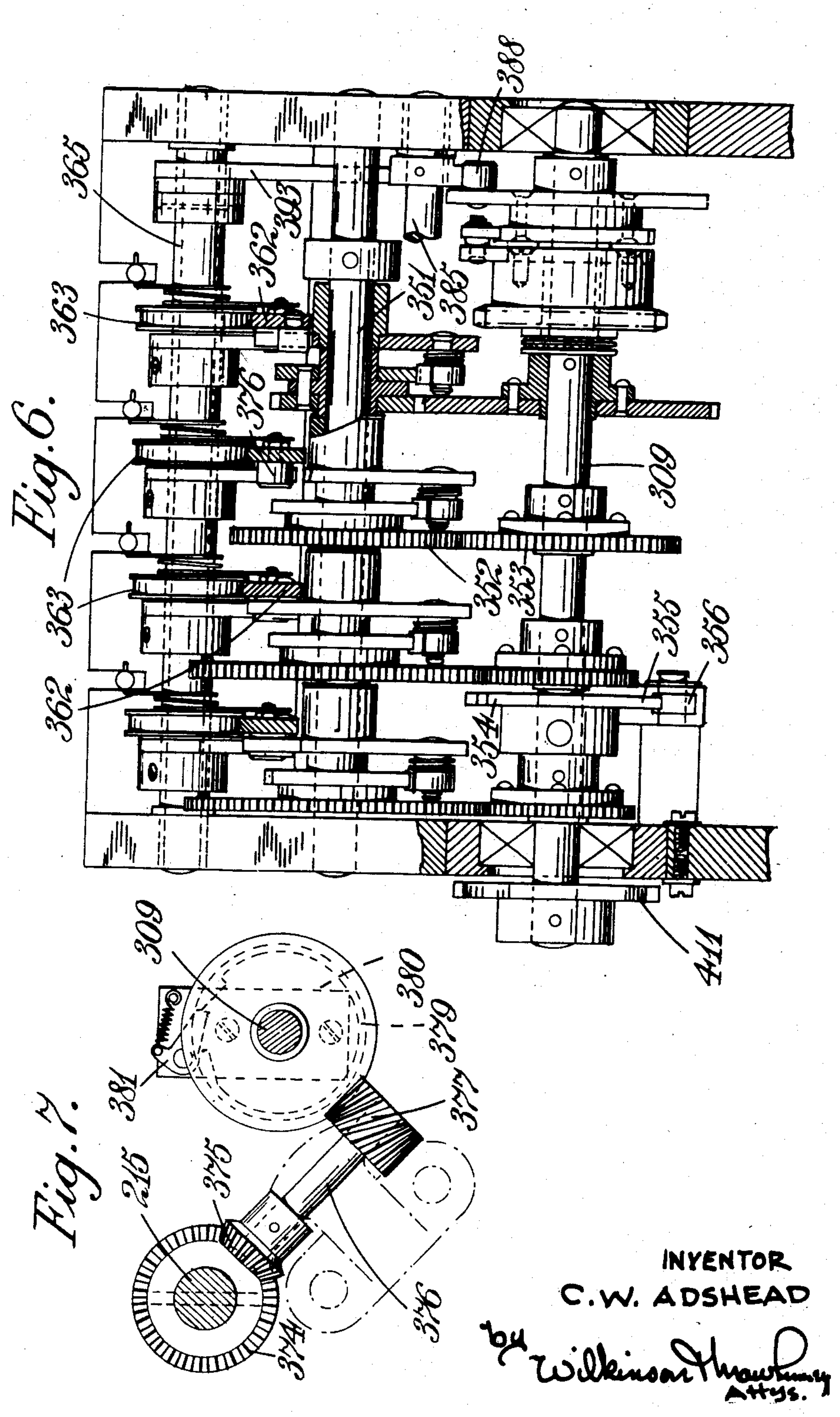
Figure 6 is a view on the line 6—6 in Figure 5.
Figure 7 is a detail view on the lines 7—7 in Figure 2C.

Parallel to the shaft 215 there is a shaft 351 on which is mounted one gear 352 for each of the buttons 202. Each of the said gears meshes with one of four gears 353 on shaft 309 (Figures 5 and 6). Also on shaft 309 there is mounted a control disc 355, of circular shape, with three abutments or cam lobes 354 at knock-off positions equally spaced around the circumference. A roller 356, on an arm 357, pivoted at 358 to the frame of the machine, rolling on the circumference of said control disc is held against the edge of the disc by the spring 360. When the roller rides on to an abutment 354 the other end of the arm 357 lies in the path of the spring urged pawl lever 349, causing the shaft 215 to become disengaged from the driving gear when the pawl engages the arm.

Each of the quantity selecting buttons 202 is secured to a bar 362 guided for rectilinear movement, in grooved wheels 363, 364 on shafts 365, 398 respectively, parallel with shaft 215. Each bar 362 is provided with a pin 366 located in a slot 367 in an arm 368 pivoted on the shaft 351. Each arm 368 carries at its other end a spring ratchet 370 engaging with a wheel 371, integral with the gear 352 allocated to that button. On pressing a button 202 the arm 368 is rotated, thus rotating the appropriate gear 352 through the ratchet mechanism. This in turn will rotate the corresponding gear 353, and hence, the control disc 355, from a "knock-off" position to a desired position between the original "knock-off" position and the following one. In order to turn the control disc to the following "knock-off" position a reset mechanism, best shown in Figure 7, is provided.

The reset mechanism comprises a bevel gear 374 on shaft 215, meshing with a bevel gear 375 on a cross-shaft 376, a worm 377 at the other end of said shaft 376 engaging a worm wheel 379 on shaft 309, and integral with heeel 379 a ratchet wheel 380 engaging with a spring urged ratchet 381 pivoted to the frame of the machine.

During the operation of the reset mechanism the gears 353, 352 will be rotated, thus rotating the wheels 371, which will over-ride the ratchets 370.

The amounts of angular rotation of the ratchet wheel 371, the control disc 355, the number of teeth on gears 352, 353, and the movement of buttons 202 for printing and issuing 1, 2, 3 and 4 tickets respectively are shown in the following table.

| Quantity of Tickets | Operation Movement | | Gear Ratio 352/353 | No. of Gear teeth | | Movement of Shaft 309 | | Reset Movement Wheel 371 |
|---|---|---|---|---|---|---|---|---|
| | Button 202 | Wheel 371 | | 352 | 353 | Operation | Reset | |
| | *Inches* | *Degrees* | | | | *Degrees* | *Degrees* | *Degrees* |
| 1 | 0.438 | 48 | 1/2 | 60 | 30 | 96 | 24 | 12 |
| 2 | 0.354 | 36 | 1/2 | 60 | 30 | 72 | 48 | 24 |
| 3 | 0.438 | 48 | 1/1 | 45 | 45 | 48 | 72 | 72 |
| 4 | 0.438 | 48 | 2/1 | 30 | 60 | 24 | 96 | 192 |

Since the mechanisms for one and two tickets have the same gear ratios the variation in angular movement of the control disc is produced by varying the linear motion of the bar 362. The travel of each of the said bars is preset by the set screws 373.

Figures 8, 9:
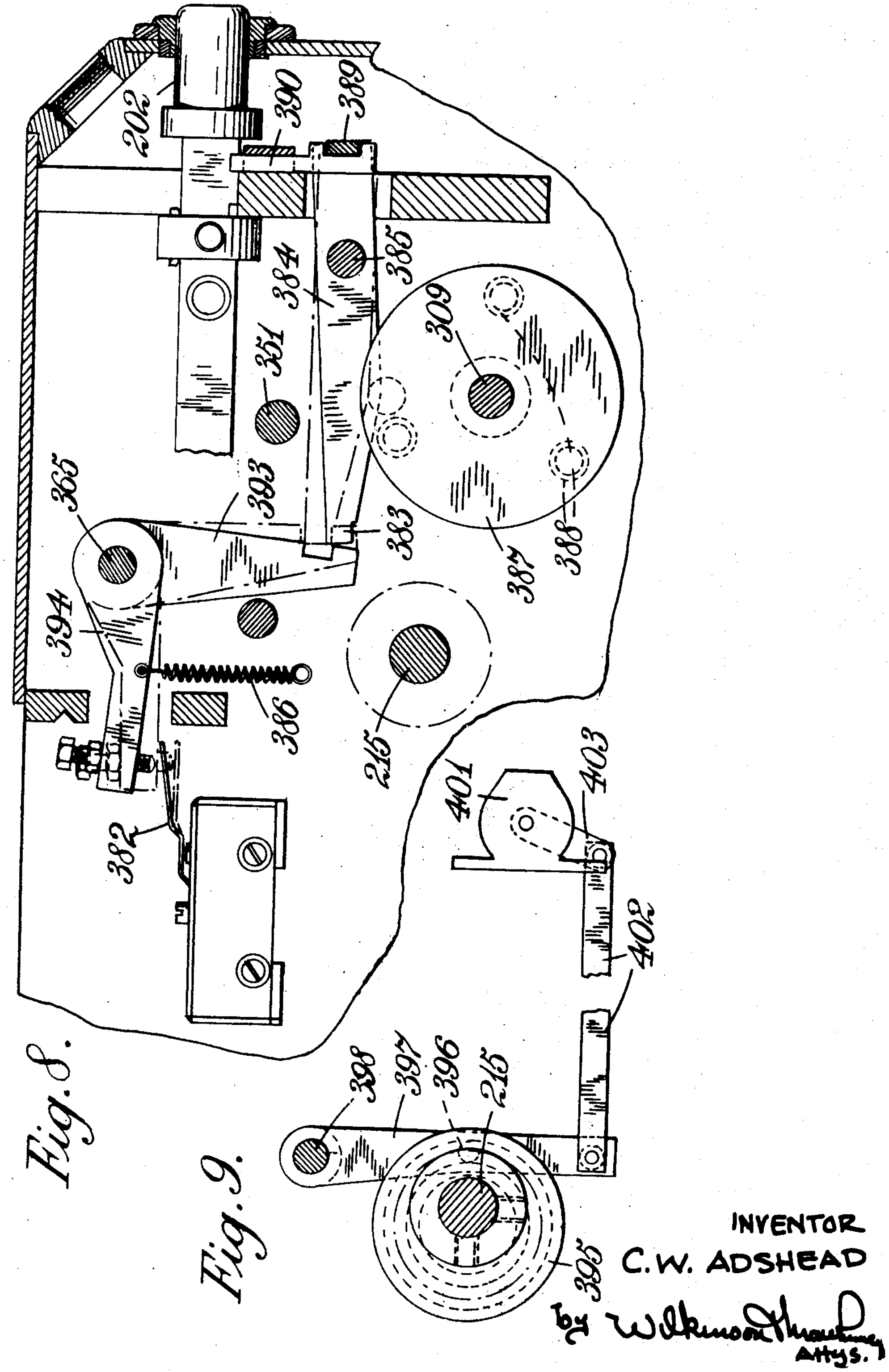
Figure 8 is a section on the line 8—8 in Figure 2C.
Figure 9 is a view in the direction 9—9 in Figure 2C showing mechanism for operating a ticket counter.

Each of the bars 362 is provided with a projecting pin 376 which presses against arms 377 on the shaft 365. Springs 378 urge the arms anti-clockwise as viewed in Figure 5. Also revolving on shaft 365 is a bell-crank (Figure 8), with one arm 393 engaging at its end with a latch 383 at the end of an arm 384 pivoted at 385 to the frame of the machine. The free end of the other arm 394 of the said bell-crank controls a switch 382 for the motor. When the arm 384 is latched to the bell-crank the switch is depressed to an "off" position, and when the bell-crank is turned in a clockwise direction as shown in Figure 8, the switch is raised to an "on" position. A disc 387 rotating with shaft 309 has three pins 388 arranged at equal distances around its periphery. These pins, in turn rock arm 384, enabling the bell-crank arm 393 to be relatched when urged to its original position by the spring 386.

Figure 12:
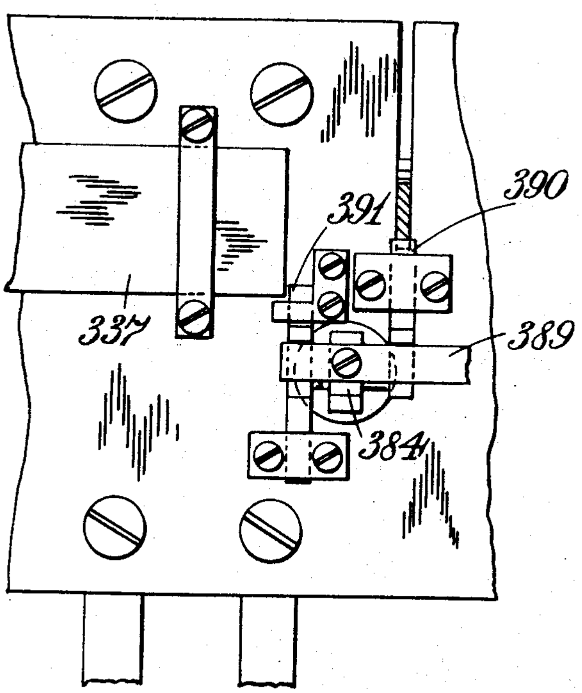
Figure 12 is a view showing interlocking means for the quantity and value selecting buttons.

The arm 384 carries at the end remote from the latch 383 a bar 389 which extends across the four quantity buttons 202. At each of the quantity button positions the bar 389 carries a slide 390, and at the end nearest to the value selection buttons a slide 391 (Figure 12). When the arm 384 is unlatched from the bell-crank arm 393 and allowed to drop the slides 390 are raised by the bar 389 and engage the buttons 202 in either of the slots 392 according to the position of the button, to prevent depression of any of the buttons 202 during the time the motor is running and the machine operating. The slide 391 is also raised when the arm 384 is allowed to drop and constitutes an abutment preventing movement of the slide 337 and so preventing operation of the value selecting buttons.

When the arm 384 has been relatched the spring 378 causes the button 202, depressed, to return to its original position. A ball and rod locking device 420 similar to that employed for the value selecting buttons is provided to prevent simultaneous depression of two of the quantity selecting buttons.

Rotating with the shaft 215 is an eccentric cam 395 (Figure 9) provided with a slot concentric with its centre of curvature. A pin 396 on a lever 397, pivoted at 398 to the frame of the machine is free to run in the slot on the said cam, thus causing the lever 397 to oscillate with one complete cycle per revolution of the shaft 215. This motion is transferred to a ticket counter 401 by links 402 and 403. The ticket counter will record the total number of tickets issued since the shaft 215 revolves once for each ticket issued.

In an arrestor mechanism (Figure 10) an arm 406 pivoted at 407 to the frame of the machine is attached at its far end to a helical spring 408, also fixed to the frame of the machine. At a point intermediate of the ends the bar carries a pin 409 which is held against the periphery of a cam 411 rotating on shaft 309. The said cam comprises a circular disc concentric with the axis of shaft 309, provided with three arcuate depressions equally spaced around the periphery of the disc, each depression being in the same angular arrangement as the "knock-off" positions 354 on the control disc 355. When the pin 409 lies in an arcuate depression on the cam the arm 406 is pulled towards a pin 413 on a lozenge shaped plate 414 integral with the shaft 215, and since the arm 406 is provided with a groove 415, to fit round the pin 413, the shaft 215 is prevented from rotating. To overcome the inertia the plate 414 is provided with a spring shock absorber 416 between a pin 417 on the plate 414 and an anchor pin 418 riveted to the ticket printing driving gear.

*Operation*

The operation of the machine to issue, say four tickets of a particular value, is as follows. The operator depresses the value selecting button appropriate to the value of ticket required which presses the appropriate feed roller into engagement with the ticket strip and by disengagement of the latching engagement between arms 216 and 220 releases the appropriate platen for operation by the cam 214. The operator then depresses the four-ticket selecting button 202 which rotates the arm 368, the wheel 371, the gears 352 by 48°, and gear 353 of the four-ticket mechanism, and hence the control disc 355 by 24°. The bell-crank 393, 394 is at the same time turned in a clockwise direction as viewed in Figure 8, closing the switch 387 to energise the motor. The arm 393 of the bell-crank is held off by the arm 384, which also causes the buttons 202 to be locked. The motor then rotates the shaft 215 through the pawl and dog teeth 349 and 346 respectively for four revolutions of the shaft 215. At each revolution the appropriate printing platen is reciprocated once by means of the cam 214 and the feeding rollers are rotated by means of the Geneva mechanism to feed and issue the tickets between the printing operations. Each ticket as it is issued is cut off by the guillotine.

At the end of the fourth revolution when the tickets have been issued the reset mechanism has rotated the control disc 355 by 96° to the next "knock-off" position, the pawl 349 is knocked out of engagement with the dog teeth 346 by the roller 356 on the arm 357. At the same time one of the pins 388 on the disc 387 lifts the arm 384 enabling the depressed button to resume its original position and the bell-crank arm 393 to engage with the latch 383. The motor is deenergised and the shaft 215 brought to rest by the arrestor mechanism.

If a lesser number of tickets is required the appropriate button is depressed thus for say two tickets, the two-ticket quantity button is depressed which rotates the ratchet wheel and gear 352 by 36° and the gear 353 with the control disc 355 by 72°, leaving only 48° for movement by the reset mechanism. To turn the control disc through 48° the shaft 215 only makes two revolutions before the drive is stopped.

I claim:

1. A ticket printing and issuing machine comprising: (*a*) at least two independently operable printing blocks and platens allocated to tickets of different characteristics (e. g. values) and arranged for relative reciprocation to apply printing pressure to blank ticket strips fed between the blocks and platens; (*b*) a corresponding number of pairs of feeding rollers allocated to the several printing blocks respectively and arranged for relative movement into and out of pressure engagement to feed blank ticket strips between the printing blocks and platens and to issue the printed tickets from the machine; (*c*) a group of a corresponding number of press buttons allocated to the blocks and feed rollers respectively and operable to select for operation any one of the printing blocks and to cause strip feeding pressure engagement between the pair of feed rollers associated with the selected block; (*d*) an electric driving motor; (*e*) a rotatable primary driven member; (*f*) a releasable rotatable pawl-and-ratchet driving connection between the motor and the driven member, the pawl being rotatable with the driven member; (*g*) a rotatable control member; (*h*) at least one abutment rotatable with the control member from a position in which the abutment lies in the path of the pawl as the pawl rotates and serves on contact therewith to disengage the pawl from the ratchet and thereby to release the drive, into any one of a series of positions outside said path; (*i*) a further group of push buttons for selecting any one of a predetermined range of quantities of tickets; (*j*) driving connections of varying ratios between the quantity push buttons and the control member, the ratios being such that the control member and abutment are rotated on operation of the buttons from the pawl-disengaging position of the abutment through varying angels of rotation depending upon the quantity values of the push buttons, into the aforesaid positions of the abutment outside the path; (*k*) a drive between the primary driven member and the control member to set the control member to the disengaging position of the abutment after the primary member has been rotated a sufficient number of turns to print and issue the quantity of tickets selected; (*l*) cam means driven by the primary member for operating any "selected" printing block and platen; and (*m*) intermittent driving means between the primary member and one of each pair of the feed rollers to rotate the rollers between the printing operations of the printing blocks and thereby to cause the pair of rollers in pressure engagement to feed fresh portions of the strip to the operative printing block and to issue the tickets printed.

2. A ticket printing and issuing machine as claimed in claim 1 and including a series of parallel control circuits for the motor appropriated to the several printing mechanisms respectively, switches in the circuits and means for opening the switch in any circuit should the continuity of the ticket strip to the printing mechanism associated with that circuit be broken.

3. A ticket printing and issuing machine as claimed in claim 1 and including a guillotine for cutting off the issued tickets, operable by the printing mechanism.

4. A ticket printing and issuing machine as claimed in claim 1 and including resilient arresting mechanism for stopping over-run of the machine at the end of a ticket issuing operation.

5. A ticket printing and issuing machine comprising: (*a*) at least two independently operable printing blocks and platens allocated to tickets of different characteristics (e. g. values) and arranged for relative reciprocation to apply printing pressure to blank ticket strips fed between the blocks and platens; (*b*) a corresponding number of pairs of feeding rollers allocated to the several printing blocks respectively and arranged for relative movement into and out of pressure engagement to feed blank ticket strips between the printing blocks and platens and to issue the printed tickets from the machine; (*c*) a group of a corresponding number of press buttons allocated to the blocks and feed rollers respectively and operable to select for operation any one of the printing blocks and to cause strip feeding pressure engagement between the pair of feed rollers associated with the selected block; (*d*) an electric driving motor; (*e*) a rotatable primary driven member; (*f*) a releasable rotatable pawl-and-ratchet driving connection between the motor and the driven member, the pawl being rotatable with the driven member; (*g*) a rotatable control member; (*h*) a plurality of abutments arranged in succession around the axis of rotation of the control member and each rotatable with the control member from a position in which the abutment lies in the path of the pawl as the pawl rotates and serves on contact therewith to disengage the pawl from the ratchet and thereby to release the drive, into any one of a series of positions outside said path; (*i*) a further group of push buttons for selecting any one of a predetermined range of quantities of tickets; (*j*) driving connections of varying ratios between the quantity push buttons and the control member, the ratios being such that the control member and an abutment are rotated on operation of the buttons from the pawl-disengaging position of the abutment through varying angles of rotation depending upon the quantity values of the push buttons, into the aforesaid positions of the abutment outside the path; (*k*) a drive between the primary driven member and the control member to set the control member to the disengaging position of the next abutment after the primary member has been rotated a sufficient number of turns to print and issue the quantity of tickets selected; (*l*) cam means driven by the primary member for operating any "selected" printing block and platen; and (*m*) intermittent driving means between the primary member and one of each pair of the feed rollers to rotate the rollers between the printing operations of the printing blocks and thereby to cause the pair of rollers in pressure engagement to feed fresh portions of the strip to the operative printing block and to issue the tickets printed.

6. A ticket printing and issuing machine as claimed in claim 5 and including a series of parallel control circuits for the motor appropriate to the several printing mechanisms respectively, switches in the circuits and means for opening the switch in any circuit should the continuity of the ticket strip to the printing mechanism associated with that circuit be broken.

7. A ticket printing and issuing machine as claimed in claim 5 and including a guillotine for cutting off the issued tickets, operable by the printing mechanism.

8. A ticket printing and issuing machine as claimed in claim 5 and including resilient arresting mechanism for stopping over-run of the machine at the end of a ticket-issuing operation.

9. A ticket printing and issuing machine comprising: (*a*) at least two independently operable printing blocks and platens allocated to tickets of different characteristics (e. g. values) and arranged for relative reciprocation to apply printing pressure to blank ticket strips fed between the blocks and platens; (*b*) a corresponding number of pairs of feeding rollers allocated to the several printing blocks respectively and arranged for relative movement into and out of pressure engagement to feed blank ticket strips between the printing blocks and platens and to issue the printed tickets from the machine; (*c*) a group of a corresponding number of press buttons allocated to the blocks and feed rollers respectively and operable to select for operation any one of the printing blocks and to cause strip feeding pressure engagement between the pair of feed rollers associated with the selected block; (*d*) an electric driving motor; (*e*) a rotatable primary driven member; (*f*) a releasable rotatable pawl-and-ratchet driving connection between the motor and the driven member, the pawl being rotatable with the driven member; (*g*) a rotatable control member; (*h*) a member displaceable from a position in which it lies outside the path in which the pawl rotates to a position in which it lies in the path and serves on contact with the pawl to disengage the pawl from the ratchet and thereby to release the drive; (*i*) at least one abutment rotatable with the control member from a position in which it constrains said displaceable member to lie in the path of the pawl as aforesaid, to any one of a series of alternative positions in which the displaceable member is free from such constraint; (*j*) a further group of push buttons for selecting any one of a predetermined range of quantities of tickets; (*k*) driving connections of varying ratios between the quantity push buttons and the control member, the ratios being such that the control member and abutment are rotated on operation of the buttons from the displaceable-member-constraining position of the abutment through varying angles of rotation depending upon the quantity values of the push buttons, into the aforesaid alternative positions of the abutment; (*l*) a drive between the primary driven member and the control member to set the control member to the displaceable-member-constraining position of the abutment after the primary member has been rotated a sufficient number of turns to print and issue the quantity of tickets selected; (*m*) cam means driven by the primary member for operating any "selected" printing block and platen; and (n) intermittent driving means between the primary member and one of each pair of the feed rollers to rotate the rollers between the printing operations of the printing blocks and thereby to cause the pair of rollers in pressure engagement to feed fresh portions of the strip to the operative printing block and to issue the tickets printed.

10. A ticket printing and issuing machine comprising (a) at least two independently operable printing blocks and platens allocated to tickets of different characteristics (e. g. values) and arranged for relative reciprocation to apply printing pressure to blank ticket strips fed between the blocks and platens; (b) a corresponding number of pairs of feeding rollers allocated to the several printing blocks respectively and arranged for relative movement into and out of pressure engagement to feed blank ticket strips between the printing blocks and platens and to issue the printed tickets from the machine; (c) a group of a corresponding number of press buttons allocated to the blocks and feed rollers respectively and operable to select for operation any one of the printing blocks and to cause strip feeding pressure engagement between the pair of feed rollers associated with the selected block; (d) an electric driving motor; (e) a rotatable primary driven member; (f) a releasable rotatable pawl-and-ratchet driving connection between the motor and the driven member, the pawl being rotatable with the driven member; (g) a rotatable control member; (h) a member displaceable from a position in which it lies outside the path in which the pawl rotates to a position in which it lies in the path and serves on contact with the pawl to disengage the pawl from the ratchet and thereby to release the drive; (i) a plurality of abutments arranged in succession around the axis of rotation of the control member and each rotatable with the control member from a position in which it constrains the said displaceable member to lie in the path of the pawl as aforesaid, to any one of a series of alternative positions in which the displacement member is free from such constraint; (j) a further group of push buttons for selecting any one of a predetermined range of quantities of tickets; (k) driving connections of varying ratios between the quantity push buttons and the control member, the ratios being such that the control member and an abutment are rotated on operation of the buttons from the displaceable-member-constraining position of the abutment through varying angles of rotation depending upon the quantity value of the push buttons, into the aforesaid alternative positions of the abutment; (l) a drive between the primary driven member and the control member to set the control member to the displaceable-member-constraining position of the next abutment in the succession after the primary member has been rotated a sufficient number of turns to print and issue the quantity of tickets selected; (m) cam means driven by the primary member for operating any "selected" printing block and platen; and (n) intermittent driving means between the primary member and one of each pair of the feed rollers to rotate the rollers between the printing operations of the printing blocks and thereby to cause the pair of rollers in pressure engagement to feed fresh portions of the strip to the operative printing block and to issue the tickets printed.

11. In a machine for issuing varying numbers of tickets printed in succession along a web, means for issuing a "selected" number of tickets comprising: (a) a driving member; (b) a rotatable primary driven member; (c) a releasable rotatable pawl and ratchet driving coupling between the driving member and the primary driven member, the pawl being rotatable with the driven member; (d) a rotatable control member; (e) an abutment rotatable with the control member from a position in which the abutment lies in the path of the pawl as the pawl rotates and serves on contact therewith to disengage the pawl from the ratchet and thereby to release the drive, into any one of a series of positions outside said path; (f) a group of push buttons for selecting any one of a predetermined range of quantities of tickets, each push button being allocated to a different quantity; (g) driving connection of varying ratios between the quantity push buttons and the control member, the ratios being such that the control member and abutment are rotated on operation of the buttons from the pawl-disengaging position of the abutment through varying angles of rotation depending upon the quantity values of the push buttons, into the aforesaid positions of the abutment outside the path; (h) a drive between the primary driven member and the control member to set the control member to the disengaging position of the abutment after the primary member has been rotated a sufficient number of turns to issue the quantity of tickets selected; (i) a feed roller for engaging and feeding the ticket web, and (j) a driving means between the primary member and the feed roller to rotate the roller intermittently during rotation of the primary member as aforesaid.

12. In a machine for issuing varying numbers of tickets printed in succession along a web, means for issuing a "selected" number of tickets comprising: (a) a driving member; (b) a rotatable primary driven member; (c) a releasable rotatable pawl and ratchet driving coupling between the driving member and the primary driven member, the pawl being rotatable with the driven member; (d) a rotatable control member; (e) a member displaceable from a position in which it lies outside the path in which the pawl rotates to a position in which it lies in the path and serves on contact with the pawl to disengage the pawl from the ratchet and thereby to release the drive; (f) an abutment rotatable with the control member from a position in which it constrains the displaceable member to lie in the path of the pawl as aforesaid to any one of a series of alternative positions in which the displaceable member is free from such constraint; (g) a group of push buttons for selecting any one of a predetermined range of quantities of tickets each push button being allocated to a different quantity; (h) driving connections of varying ratios between the quantity push buttons and the control member, the ratios being such that the control member and abutment are rotated on operation of the buttons from the displaceable-member-constraining position of the abutment through varying angles of rotation depending upon the quantity values of the push buttons, into the aforesaid alternative positions of the abutment; (i) a drive between the primary driven member and the control member to set the control member to the displacement-member-constraining position of the abutment after the primary member has been rotated a sufficient number of turns to issue the quantity of tickets selected; (j) a feed roller for engaging and feeding the ticket web, and (k) a driving means between the primary member and the feed roller to rotate the roller during rotation of the primary member as aforesaid.

13. In a machine for issuing varying numbers of tickets printed in succession along a web, means for issuing a "selected" number of tickets comprising: (a) a driving member; (b) a rotatable primary driven member; (c) a releasable rotatable pawl and ratchet driving coupling between the driving member and the primary driven member, the pawl being rotatable with the driven member; (d) a rotatable control member; (e) a member displaceable from a position in which it lies outside the path in which the pawl rotates to a position in which it lies in the path and serves on contact with the pawl to disengage the pawl from the ratchet and thereby to release the drive; (f) a plurality of abutments arranged in succession around the axis of rotation of the control member and each rotatable with the control member from a position in which it constrains the said displaceable member to lie in the path of the pawl as aforesaid, to any one of a series of alternative positions in which the displacement member is free from such constraint; (g) a group of press buttons for selecting any one of a predetermined range of quantities of tickets, each push button being allocated to a different quantity; (h) driving connections of varying ratios between the quantity push buttons and the control member, the ratios being such that the control and an abutment are rotated on operation of the buttons from the displaceable-member-constraining position of the abutment through varying angles of rotation depending upon the quantity value of the push buttons, into the aforesaid alternative positions of the abutment; (i) a drive between the primary driven member and the control member to set the control member to the displaceable-member-constraining position of the next abutment in the succession after the primary member has been rotated a sufficient number of turns to issue the quantity of tickets selected; (j) a feed roller for engaging and feeding the ticket web, and (k) a driving means between the primary member and the feed roller to rotate the roller intermittently during rotation of the primary member as aforesaid.

CHARLES WILLIAM ADSHEAD.

References Cited in the file of this patent

UNITED STATES PATENTS

| Number | Name | Date |
|---|---|---|
| 1,287,122 | Skerl | Dec. 10, 1918 |
| 1,313,958 | Skerl | Aug. 26, 1919 |
| 1,325,175 | Skerl | Dec. 16, 1919 |
| 1,449,801 | Zollin et al. | Mar. 27, 1923 |
| 1,529,639 | Eller | Mar. 10, 1925 |
| 1,539,462 | Carroll | May 26, 1925 |
| 1,862,446 | Webb | June 7, 1932 |
| 1,886,626 | Black | Nov. 8, 1932 |
| 1,964,552 | Arnold | June 26, 1934 |
| 2,044,367 | Purdy et al. | June 16, 1936 |
| 2,078,800 | Juchter | Apr. 27, 1937 |
| 2,325,054 | Helsel | July 27, 1943 |